(12) United States Patent
Gaucher et al.

(10) Patent No.: US 11,679,741 B2
(45) Date of Patent: Jun. 20, 2023

(54) COVER FOR A GLAZED-SURFACE WIPER DEVICE

(71) Applicant: Valeo Systèmes d'Essuyage, Le Mesnil Saint Denis (FR)

(72) Inventors: Vincent Gaucher, Le Mesnil Saint Denis (FR); Stéphane Houssat, Le Mesnil Saint Denis (FR); Eric Poton, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 17/104,151

(22) Filed: Nov. 25, 2020

(65) Prior Publication Data

US 2021/0162954 A1  Jun. 3, 2021

(30) Foreign Application Priority Data

Nov. 29, 2019  (FR) ...................................... 1913569

(51) Int. Cl.
  *B60S 1/38*  (2006.01)
(52) U.S. Cl.
  CPC ..... *B60S 1/3848* (2013.01); *B60S 2001/3843* (2013.01)
(58) Field of Classification Search
  CPC ...... B60S 1/4041; B60S 1/3889; B60S 1/387; B60S 1/3858; B60S 1/3879; B60S 2001/382; B60S 2001/3822; B60S 2001/4051; B60S 2001/4054; B60S 2001/38; B60S 1/38

USPC .................................................. 15/250.001
See application file for complete search history.

(56) References Cited

U.S. PATENT DOCUMENTS

| 2016/0176383 A1* | 6/2016 | Lee ...................... B60S 1/4016 |
| | | 15/250.32 |
| 2017/0203726 A1* | 7/2017 | Poton .................... B60S 1/3886 |

FOREIGN PATENT DOCUMENTS

| FR | 2738202 A1 | 3/1997 | |
| WO | WO-2009071372 A1 * | 6/2009 | ............ B60S 1/4041 |

* cited by examiner

*Primary Examiner* — Katina N. Henson
(74) *Attorney, Agent, or Firm* — Osha Bergman Watanabe & Burton LLP

(57) ABSTRACT

The present invention relates to a cover (16) for a wiper blade (6), said cover (16) being configured to collaborate with a body (102) of the wiper blade (6) in a position of covering an opening formed in the body (102), the cover (16) comprising a plurality of guide tabs (56) and an upper wall (18), said upper wall (18) being dimensioned to cover part of the opening when the cover (16) is in the covering position, the guide tabs (56) extending the upper wall (18) perpendicularly and being configured to be able to hold the cover (16) in the covering position, characterized in that the cover (16) is configured to be able to be moved in the body (102) between a moved-clear position distant from the opening, and said position of covering of the opening, said cover comprising at least one retaining tab (36) extending the upper wall perpendicularly separately from the guide tabs (56), said retaining tab (36) comprising end-of-travel end-stop means (50) configured to halt the retaining tab (36) in said moved-clear position.

13 Claims, 14 Drawing Sheets

[Fig 1]
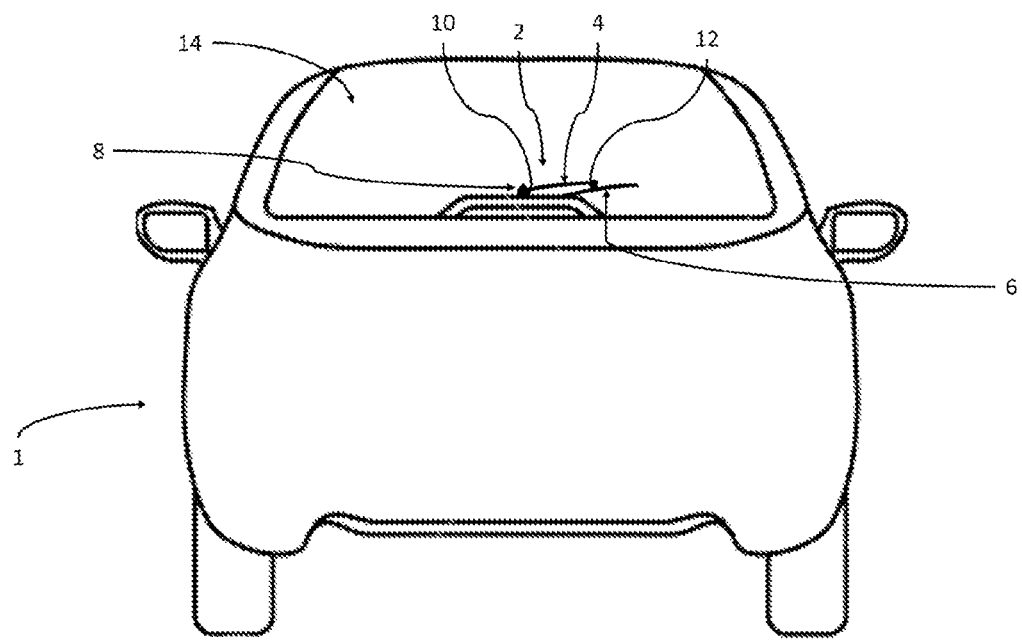

[Fig 2]
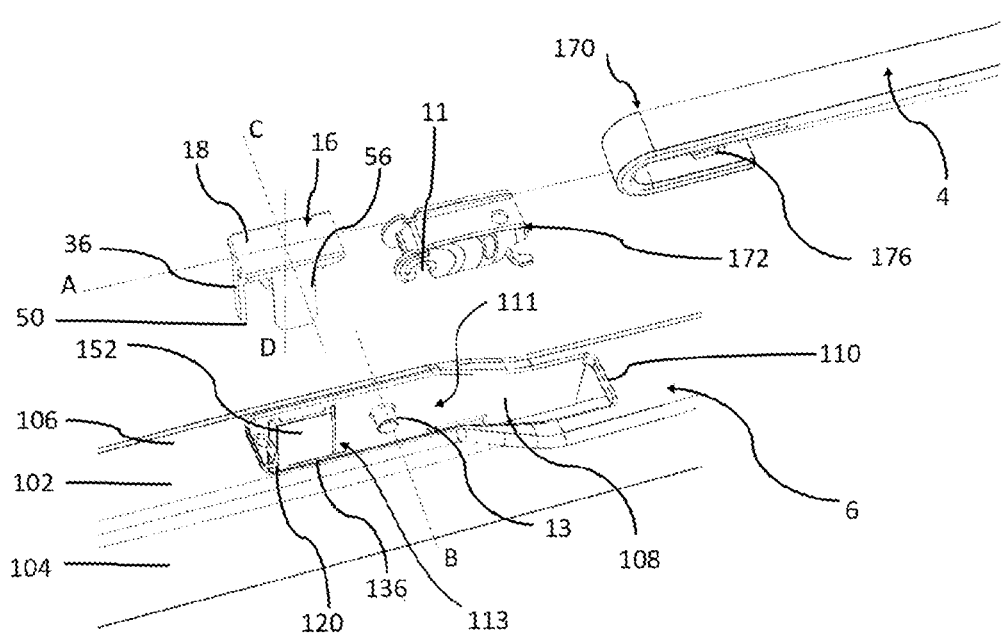

[Fig 3]
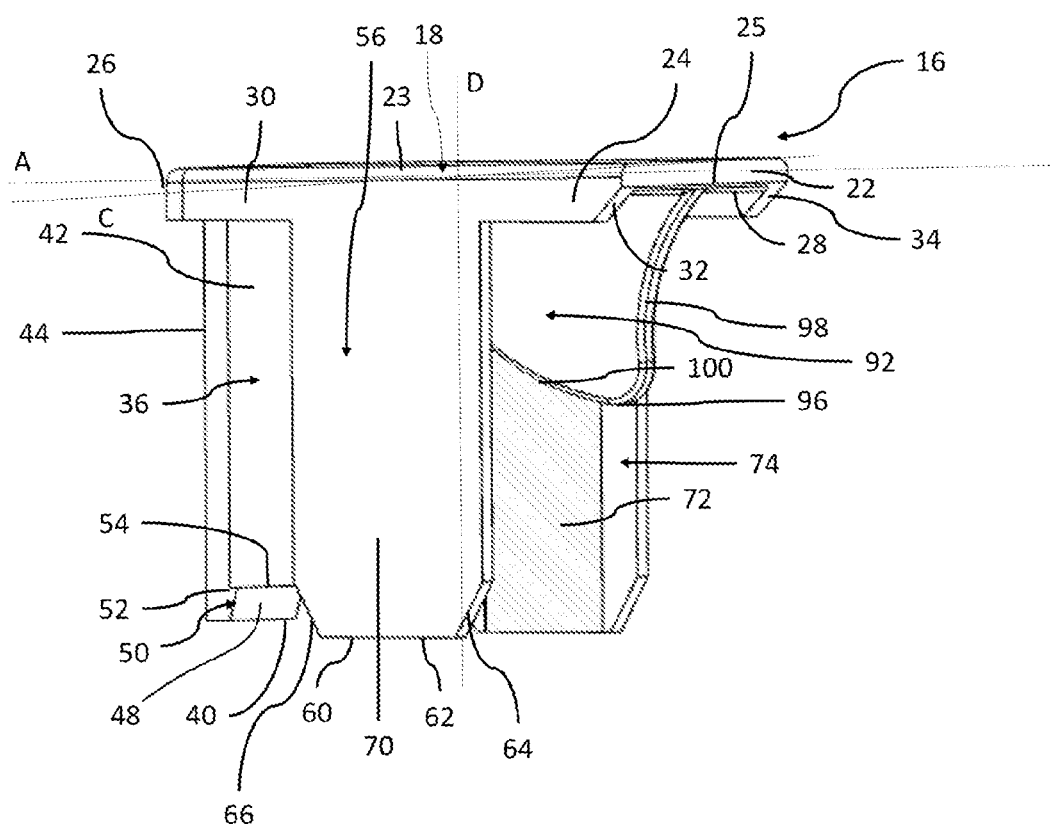

[Fig 4]
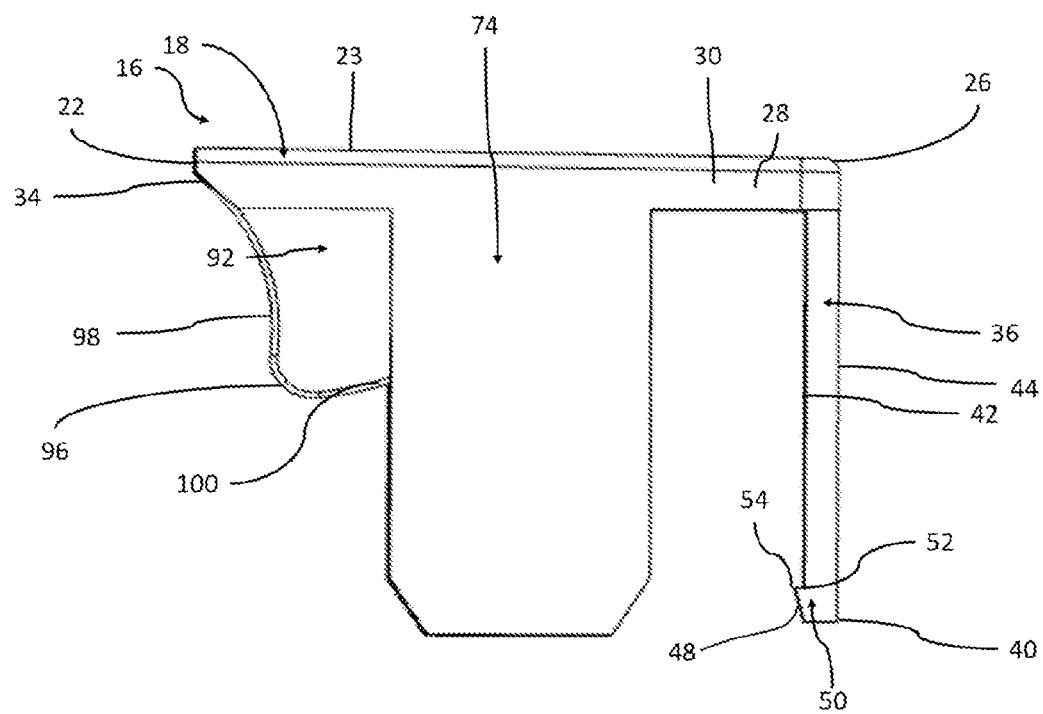

[Fig 5]
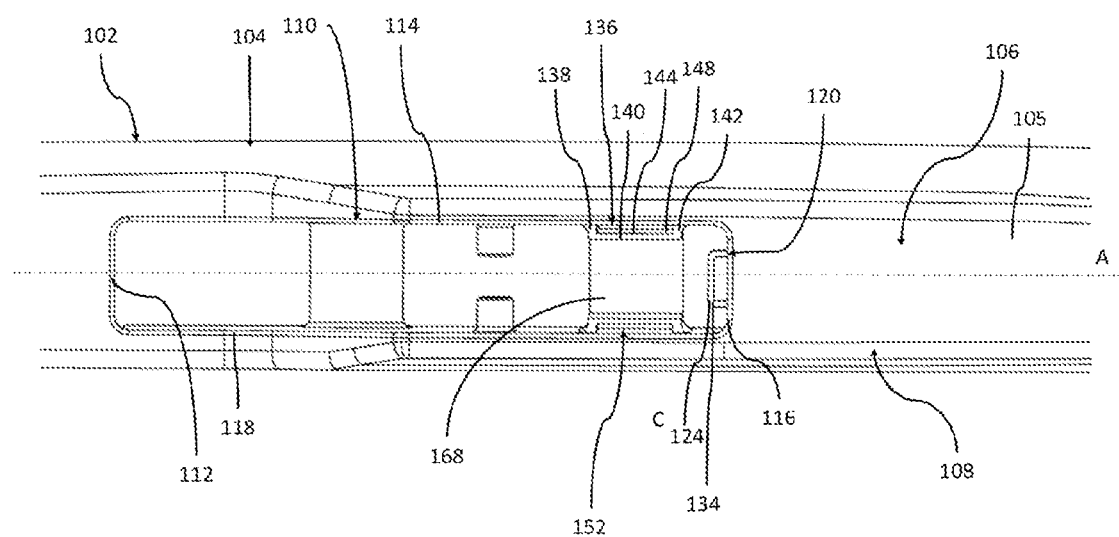

[Fig 6]
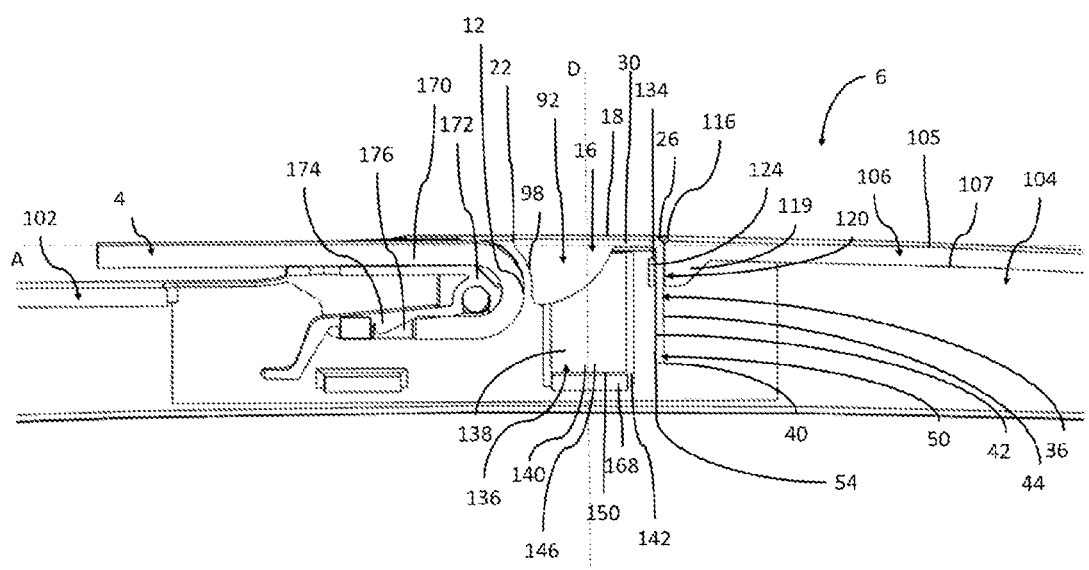

[Fig 7]
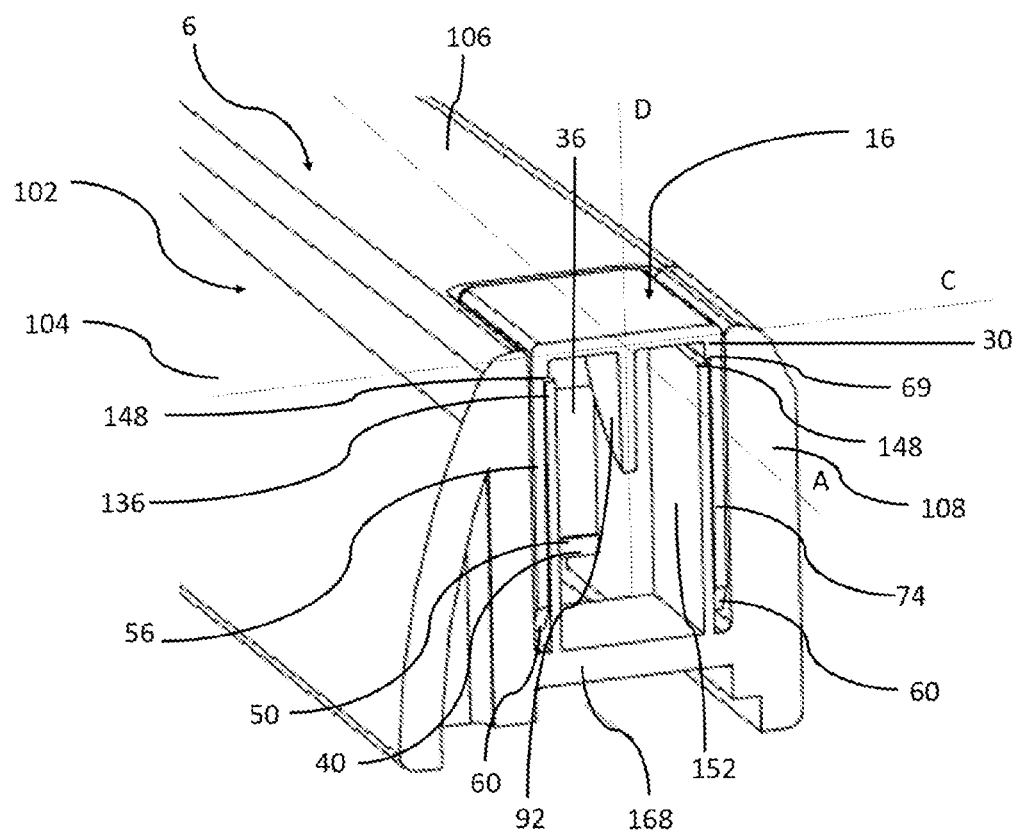

[Fig 8]
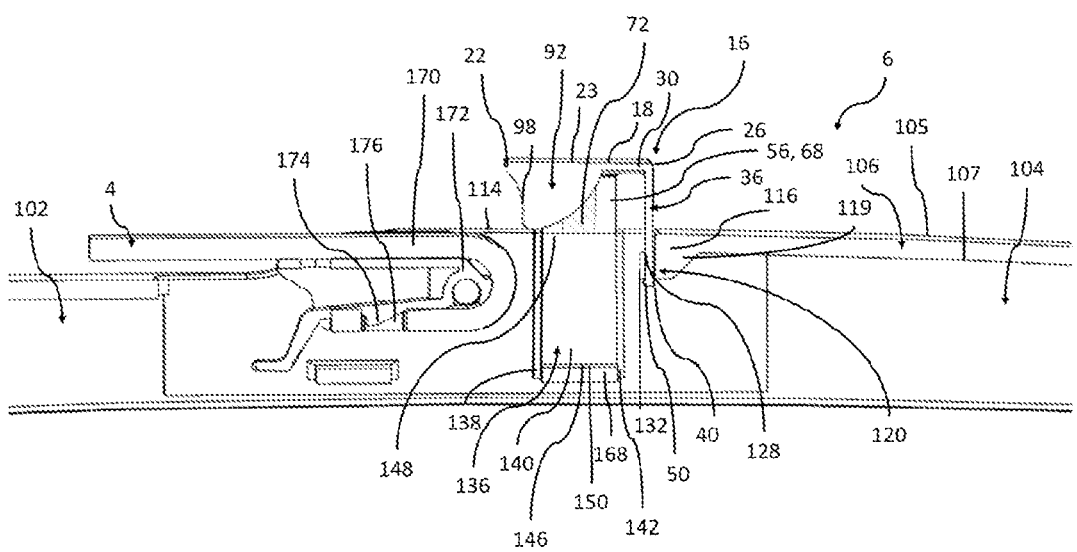

[Fig 9]
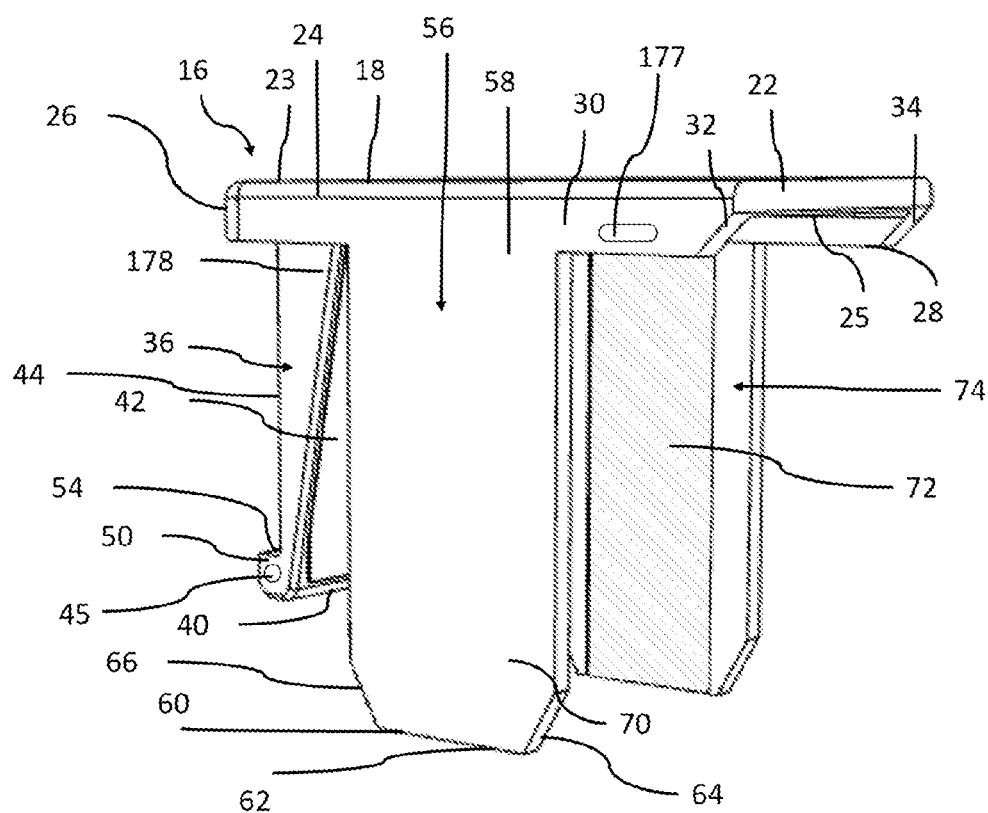

[Fig 10]
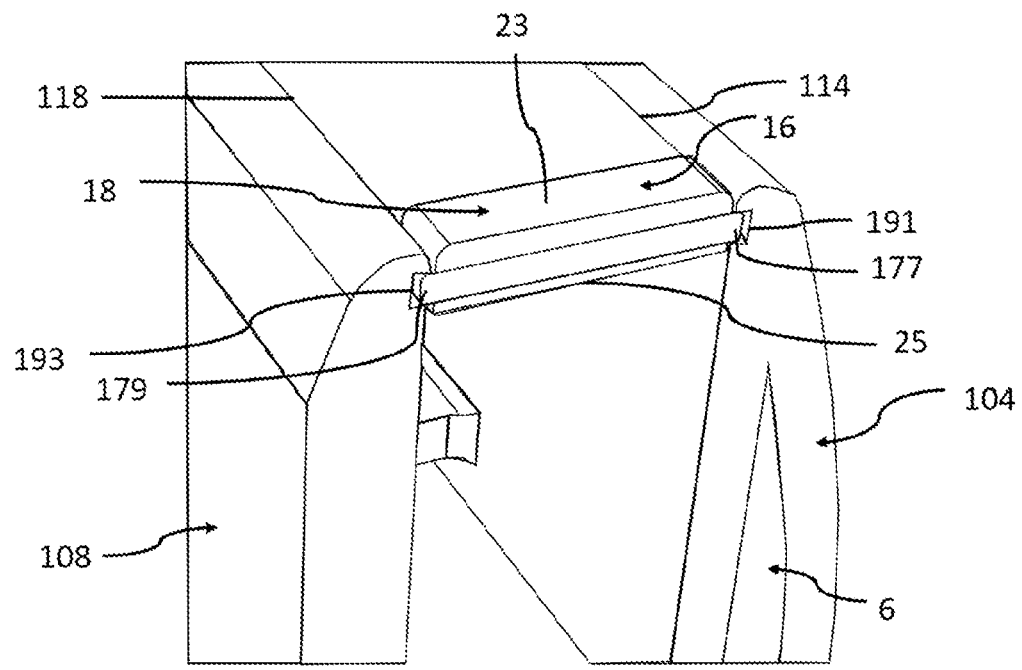

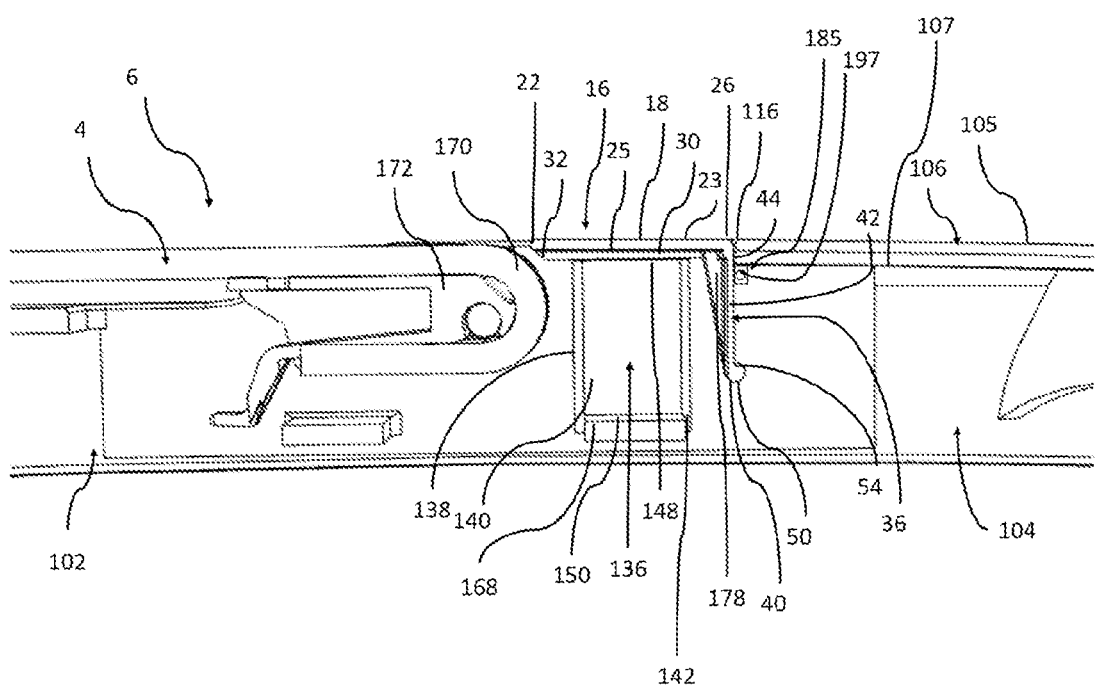
[Fig 11]

[Fig 12]
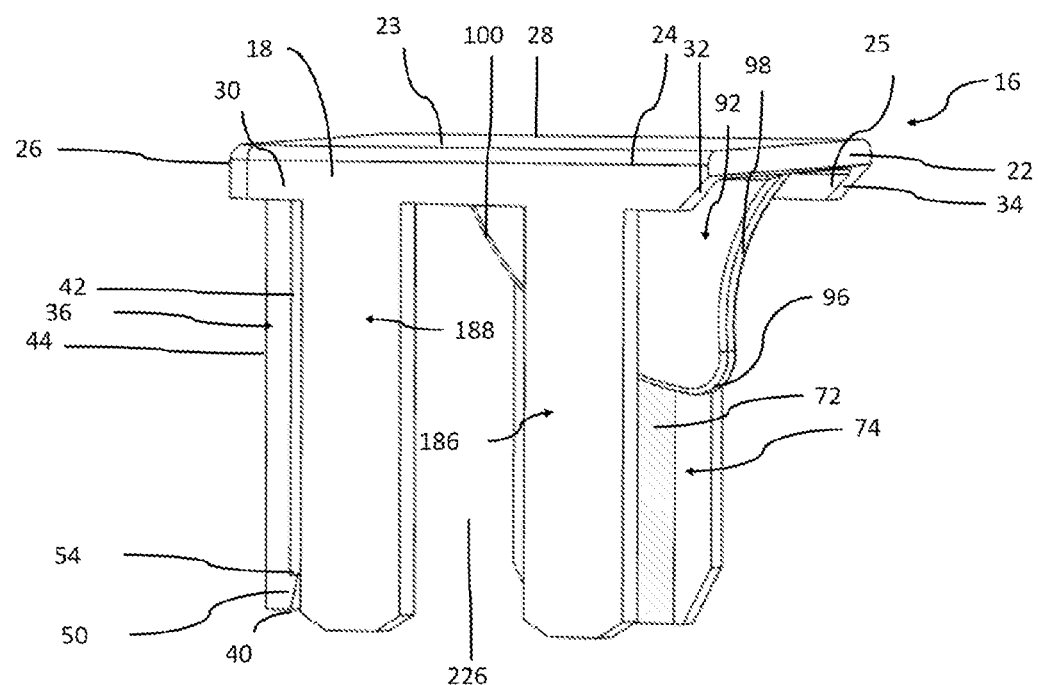

[Fig 13]
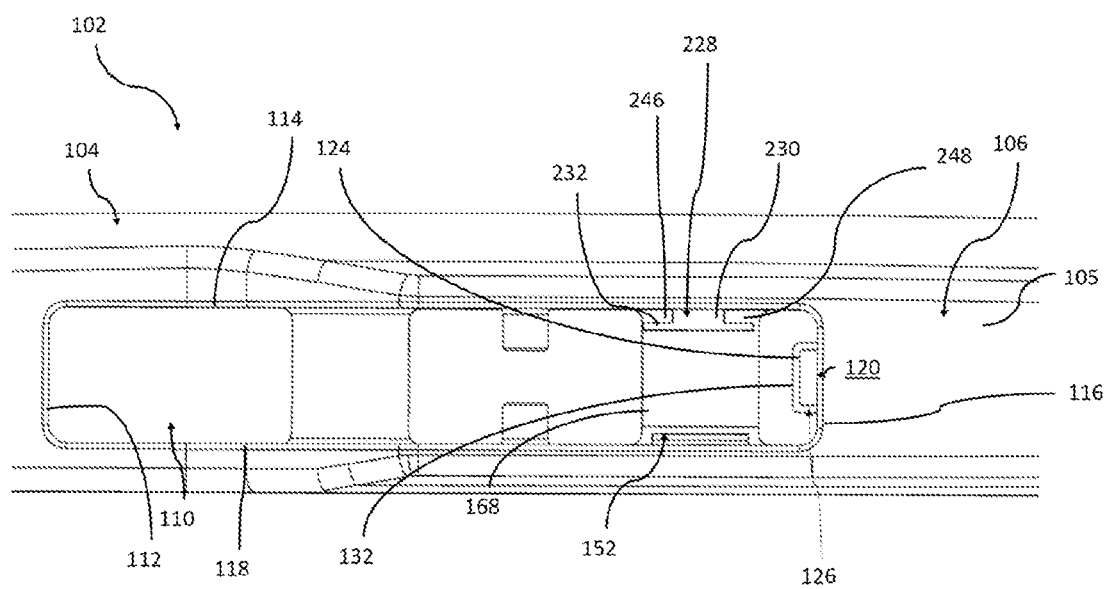

[Fig 14]
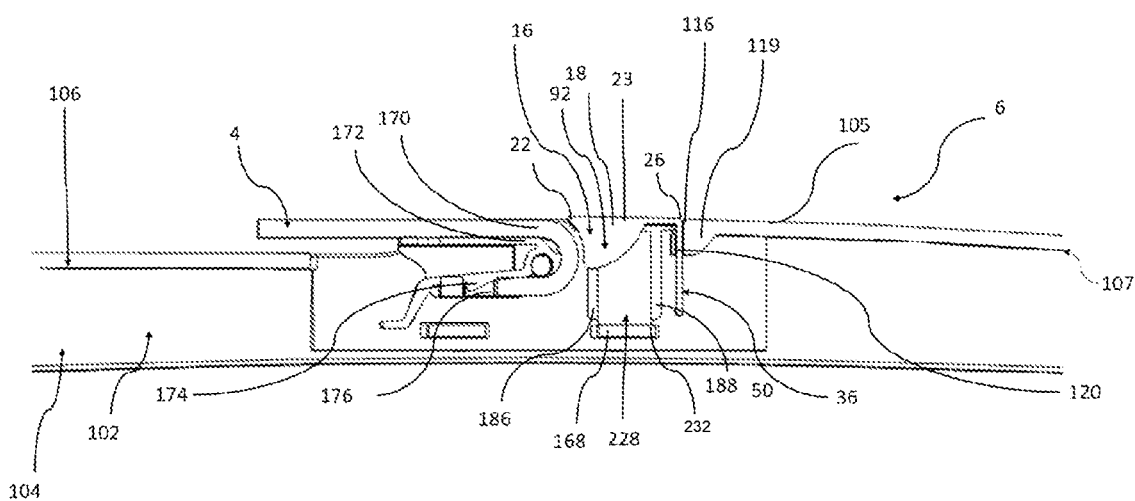

COVER FOR A GLAZED-SURFACE WIPER DEVICE

The present invention relates to the field of wiper devices for wiping glazed surfaces of motor vehicles.

The latter are commonly equipped with wiper systems for sweeping and wiping glazed surfaces, notably those arranged at the front and the rear of the vehicle, thus preventing the view that the driver has of his surroundings from being perturbed. These wiper systems conventionally comprise at least one elongate arm that wipes the glazed surface of the vehicle, and a motor driving the arm.

In such devices, the elongate arm is connected in a first part to the shaft of the motor and connected in a second part opposite the first part to a wiper blade able to be pressed snugly against the glazed surface. The wiper blade comprises at least a connector, a blade-rubber support and a blade rubber. The connector comprises a first portion connected to the wiper blade-rubber support and a second portion connected to the arm, and is conventionally mounted with the ability to pivot with respect to the blade-rubber support in order to provide a flexible connection between the arm and the blade rubber of the wiper blade so that this blade rubber can be pressed snugly against the glazed surface.

The wiper blade-rubber support and the associated blade rubber are configured to adapt to the curvature of the glazed surface of the motor vehicle. By rubbing against the glazed surface that is to be wiped, the blade rubber removes the water and the dirt therefrom, and carries them away from the driver's field of view. The connector allows flexibility in the movement of the blade rubber in relation to the arm to which the connector is connected.

The wiper blade moves back and forth, carrying the blade rubber over the glazed surface, which means that the blade rubber becomes worn and its wiping effectiveness diminishes. The user therefore has to change the wiper blade when safe driving conditions are no longer observed. The user detaches the connector of the worn wiper blade from the arm and then attaches a new wiper blade to the arm.

It is known for the arm attachment element to take the form of a hook. In that particular embodiment, the connector of the wiper blade generally comprises a shaft positioned across the blade-rubber support, and to which the hook of the arm attaches. There is an opening on the blade-rubber support so that the hook of the arm can be inserted through the blade-rubber support and engage with the connector. The hook of the arm and the connector of the wiper blade generally each comprise locking elements allowing the wiper blade to remain securely attached to the arm.

Attaching the hook to the shaft of the connector involves a movement of the arm that is such that the opening present on the blade-rubber support needs to have an extensive enough clear opening around the shaft that the hook can be pushed through in one direction until it extends beyond the shaft and then returned in substantially the opposite direction in order to engage around the shaft. As a result, once attached, the arm of the wiper blade fills only part of the opening, so a protective cover is provided in this uncovered part of the opening in order to prevent dirt and water from finding its way in through the opening in the wiper blade-rubber support.

Such a cover is removable so that it does not hamper the fitting and removal of the wiper blade in relation to the arm. In other words, as is described in application FR2738202, the cover is able to adopt a position in which it is attached to the blade-rubber support, when the arm is attached to the connector, and, during a blade-change operation, the protective cover needs to be detached from the blade-rubber support by the user so that the arm can be manipulated around the shaft. During this operation, the user has to set the protective cover aside in order to be able to attach the arm to the blade-rubber support, and the protective cover may therefore become lost, which then necessitates replacement or the use of the wiper blade without the protective cover, leaving dirt and water free to enter the space delimited by the opening in the wiper blade.

In that context, the present invention thus proposes an alternative to the existing solutions.

Thus, a first aspect of the present invention is, first of all, a cover for a wiper, said cover being configured to collaborate with a body of the wiper blade in a position of covering an opening formed in the body, the cover comprising a plurality of guide tabs and an upper wall, said upper wall being dimensioned to cover part of the opening when the cover is in the covering position, the guide tabs extending the upper wall perpendicularly and being configured to be able to hold the cover in the covering position, characterized in that the cover is configured to be able to be moved in the body between a moved-clear position in which the upper wall is distant from the opening, and the position of covering of the opening, said cover comprising at least one retaining tab extending the upper wall perpendicularly separately from the guide tabs, said retaining tab comprising end-of-travel end-stop means configured to halt the retaining tab in said moved-clear position.

The cover has the initial function of preventing dirt and water from entering the arm of the wiper blade through the opening, but must not prevent the attachment of an arm, of which the free end has the shape of the hook, to a connection device, housed in the body of the blade and accessible via the opening. In order to do that, the cover may be moved clear of its covering position, so that the upper wall is sufficiently distant from the opening that the arm can be manipulated. The cover is then in a moved-clear position.

The present invention thus proposes a cover capable of being moved within the body of the blade, so as to make it possible to clear enough space for the hook of the arm to be hooked or unhooked relative to the connector of the wiper blade, and which also has means preventing it from being removed from the body of the blade when the cover is in its moved-clear position allowing the arm to be manipulated.

The cover is blocked in its movement in such a way that it does not move beyond this moved-clear position, thanks to the presence of the retaining tab specifically provided for this purpose and which bears end-of-travel end-stop means designed to collaborate with complementary means borne by the body of the blade. In that way, the cover cannot be separated from the wiper blade without specific action by the user on the retaining tab.

According to one feature of the invention, the retaining tab comprises, at a free end, namely at an opposite end to the upper wall, an end-stop finger. The end-stop finger of the retaining tab is configured to come into contact with an element of the body of the blade when the cover is in the moved-clear position, and this contact prevents the cover from moving beyond this moved-clear position in its movement, and therefore from becoming completely separated from the wiper blade during a change of wiper blade for example.

According to another feature of the invention, the retaining tab extends chiefly in a plane perpendicular to the planes in which the guide tabs chiefly extend.

Such a configuration notably makes it possible to dissociate the guidance and end-of-travel end-stop functions, and notably ensure that the complementing guidance and end-of-travel end-stop means borne by the wiper body are arranged on walls that are mutually perpendicular.

According to another feature of the invention, the dimension of the retaining tab perpendicular to the upper wall is at least equal to half the corresponding dimension of the guide tabs.

It should be understood that a retaining tab of which the height, which is to say the dimension perpendicular to the upper wall, were less than half the corresponding height of the guide tabs, would lead to a moved-clear position of the cover in which the space left between the upper wall of the cover and the opening were insufficient for the passage of a hooked arm to fit over a connection device housed in the body of the blade and accessible via the opening.

According to another feature of the invention, the upper surface comprises a central rib extending between the guide tabs, said central rib comprising a concave edge on the opposite side to the retaining tab.

The central rib has the purpose of forming a poka-yoke means making it possible to identify incorrect attachment of the hook around the connection device. The projection formed by this central rib thus comes into abutment with the hook when the cover is brought into the covering position if the hook is not correctly positioned around the connection device. The concave edge of the central rib is configured to conform to the curvature of the hook of the arm when this is engaged with the connection device, without in any way being in contact therewith. As the arm is being fitted to the blade body, the complementing nature of these shapes may, as the cover is being moved towards its covering position once the hook is theoretically in position on the connection device, allow pressure to be generated between the concave edge of the central rib and the hook to accompany the definitive positioning of the hook on the connection device.

According to one feature of the invention, the cover comprises retaining means maintaining the position of the cover in the covering position and/or in the moved-clear position.

When the wiper blade is being fitted to/removed from the arm, the cover needs to be able to remain immobile in the moved-clear position so that the user can manipulate the arm and the blade with both hands without he himself needing to keep the cover in the moved-clear position. In addition, the cover also needs to be able to remain immobile in a covering position, in order to prevent dirt and water from entering the wiper blade. The cover position-retaining means provided for this purpose are configured to collaborate with complementing members borne by the body of the blade, and may notably be borne by the upper wall and/or the retaining tab.

A second aspect of the present invention is a wiper blade comprising a body with an opening and a cover as described hereinabove, in which the cover is able to move in the body between the covering position and the moved-clear position, the body comprising at least one end-of-travel end-stop member able to collaborate with the end-of-travel end-stop means borne by the retaining tab of the cover in order to halt the movement of the cover when the latter reaches the moved-clear position.

According to this aspect of the invention, the cover collaborates with the blade body by being able to move in such a way that the upper wall of the cover covers part of the opening in the covering position and said upper wall is distant from the body of the wiper blade in the moved-clear position.

It should be noted that the upper wall of the cover covers one part of the opening of the wiper blade body when the cover is in the covering position, whereas the other part of the opening is covered by the arm bearing the hook when the wiper blade is attached to the arm. When the cover is in the moved-clear position, the upper wall uncovers that part of the opening that was previously covered, leaving enough space for the hook of the arm so that it can engage with the connection device housed in the body of the blade at the level of the opening.

According to one feature of the invention, each of the guide tabs of the cover collaborates with a guide member solid with a wall of the blade body which delimits a housing for a connection device mounted with the ability to rotate with respect to said body. The guide member solid with the body may notably consist of a guide sleeve, of closed cross section and/or of a guide element with an open profile.

According to one feature of the invention, the guide members borne by the cover are arranged on a wall perpendicular to the axis of rotation of the connection device, and the at least one end-of-travel end-stop member is borne by a wall parallel to this axis of rotation of the connection device. Such a configuration, combined with the particular orientation of the end-stop means and of the guide means borne by the cover, is of notable benefit when the end-stop means are borne at one free end of the retaining tab and when these end-stop means are able to be introduced into the body of the blade by elastic deformation, it being possible for an assembly clearance in the direction of elastic deformation of the end-stop means to be provided between the members and the guide means.

According to one feature of the invention, the cover of the wiper blade comprises position-maintaining means maintaining the position of the cover in the covering position and/or in the moved-clear position.

According to another feature of the invention, the position-maintaining means that keep the cover in the covering position and/or the moved-clear position are formed by at least one guide member of which one dimension is tailored to achieve close guidance of the corresponding guide tabs, and/or are formed by a mating shape formed in the body of the wiper blade and sized to collaborate with the position-maintaining means that keep the cover in the covering position and/or in the moved-clear position.

Provision may, for example, be made for a transverse dimension, namely a dimension in a direction parallel to the axis of pivoting of the connection device, of the guide tabs of the cover to be substantially equal to an internal transverse dimension of the guide sleeves. The guide tabs are thus in close contact with the guide sleeves, thereby increasing the force of friction between these elements and allowing one to be kept in position relative to the other when no force is applied by the user in order to move the cover.

In the case of a position-maintaining member formed by a mating shape as mentioned hereinabove, bumps of complementing shapes may form the position-maintaining means present on the cover, it being possible for these bumps to be present on various elements of the cover in order to keep the cover in the covering position or in the moved-clear position. By way of example, the bumps may be formed on the upper wall in order to keep the cover in a covering position, the upper wall being, in this position, in contact with the edges delimiting the opening in the body of the blade. And the bumps may be formed on the end-stop means arranged at the free end of the retaining tab, in order to maintain the position of the cover when the cover is in the moved-clear position, the upper wall being distant from the body of the blade in this moved-clear position.

The invention also relates to a wiper system comprising an arm and a wiper blade as described hereinabove.

The wiper system is, for example, a windscreen wiper for a vehicle, and is positioned on a glazed surface, at the front or at the rear of the vehicle.

It will be appreciated here that the features of the cover and the features of the wiper blade both as described hereinabove, are complementing. However, they may be assessed independently, without departing from the scope of the invention.

Further features, details and advantages of the invention will become more clearly apparent, on the one hand from reading the following description, and on the other hand from several exemplary embodiments given by way of nonlimiting indication, with reference to the attached schematic drawings, in which:

FIG. 1 is a view from the rear of a vehicle equipped with a wiper system according to one aspect of the invention;

FIG. 2 is an exploded view of a wiper system according to the invention, showing a wiper-blade body, a cover, a connection device and the end of an arm forming a mounting hook;

FIG. 3 is a perspective view of a cover comprising a retaining tab, two guide tabs and a central rib;

FIG. 4 is a side view of the cover depicted in FIG. 3;

FIG. 5 is a view from above of the wiper blade body of FIG. 2, showing an opening, and guidance and end-of-travel end-stop members intended to collaborate with the cover;

FIG. 6 is a longitudinal section through a body of a wiper blade as depicted in FIG. 5 comprising a cover as depicted in FIGS. 3 and 4 in the covering position;

FIG. 7 is a perspective view of a transverse section of FIG. 6;

FIG. 8 is a view similar to that of FIG. 6, the cover being in the moved-clear position;

FIG. 9 is a perspective view of a variant embodiment of the cover, here comprising two guide tabs, one retaining tab having two retaining ribs, said cover further comprising position-maintaining means for keeping the cover in the covering position and in the moved-clear position;

FIG. 10 is a perspective view of a transverse section of the cover depicted in FIG. 9 in a covering position in a wiper blade body;

FIG. 11 is a view in longitudinal section of a wiper blade comprising a cover as depicted in FIG. 9 in the covering position;

FIG. 12 is a perspective view of a variant of cover comprising a central rib, three guide tabs and one retaining tab;

FIG. 13 is a view from above of a wiper blade body configured to collaborate with the cover of FIG. 12 and for this purpose comprising a guide sleeve, a guide element and an end-of-travel end-stop ring;

FIG. 14 is a view in longitudinal section of the body as depicted in FIG. 13 comprising a cover as depicted in FIG. 12 in the covering position.

The features, variants and different embodiments of the invention may be combined with one another, in various combinations, as long as they are not mutually incompatible or mutually exclusive. It will be possible, in particular, to imagine variants of the invention that comprise only a selection of the features described below, in isolation from the other features described, if this selection of features is sufficient to confer a technical advantage or to distinguish the invention from the state of the art.

It will be recalled that the invention disclosed proposes a cover in collaboration with a wiper blade, said cover being fitted, with the ability to move, at an opening in the wiper blade, the cover being able to move between a covering position and moved-clear position, notably through a translational movement. In this context, the cover comprises end-of-travel end-stop means configured so that the cover is halted in its movement in relation to the wiper blade body when it reaches the moved-clear position, and that it thus remains connected to the blade when in this moved-clear position.

With reference first of all to FIG. 1, a vehicle 1 is equipped with a wiper system 2 as characterized by the invention. The wiper system 2 comprises an arm 4, a wiper blade 6 and a motor 8 integrated with the vehicle 1 and configured to drive the movement of the arm and of the blade. The arm 4 comprises a first connecting end 10 connected to the motor 8 and a second connecting end 12 connected to the wiper blade 6.

The motor 8 drives, in an angular back and forth movement, both the arm 4 and the wiper blade 6 which is also pressed snugly against the glazed surface 14 of the vehicle 1 in order to perform its wiping function.

As illustrated in FIG. 2, the arm 4 has a mounting hook 170 at the second connecting end 12 and intended to collaborate with a connection device 172 connected to the wiper blade 6. The mounting hook 170 has a curvature that compliments the receiving part of the connection device 172.

The connection device 172 comprises a locking lug 174, visible in FIG. 6 for example, able to be immobilized in a locking slot 176 of the mounting hook 170 when this hook is correctly positioned around the connection device. The connection device 172 is thus secured to the locking hook 170.

The connection device 172 is also fitted with the ability to rotate on the wiper blade 6, and particularly on a body 102 of the wiper blade 6. The connection device 172 comprises a rotation bearing 11 defining an axis of rotation B about which it is able to pivot, this rotation bearing 11 being configured to collaborate with a rotation shaft solid with the wiper blade, in this instance adopting the form of rotation pins 13, respectively projecting towards the inside of the body 102, belonging to lateral walls 104, 108 of this body.

The body 102 of the wiper blade 6 has, in an intermediate transverse wall 106 connecting the lateral walls 104, 108 to one another, an opening 110 that forms a passage towards an attachment zone 111 intended to accept at least the connection device 172 and the mounting hook 170 of the arm 4. In order to allow the wiper blade 6 to be fitted to the arm 4, a clear zone 113 is available next to this attachment zone, and the opening 110 is sized to render this clear zone accessible to the mounting hook 170 of the arm 4.

As may be notably seen in FIG. 6, once the mounting hook is positioned on and secured to the connection device 172, one part of the opening 110, in line with the attachment zone 111, is covered by the arm bearing this mounting hook 170, and the other part of the opening 110, in line with the clear zone 113, is, according to the invention, covered with a cover 16.

As will now be described, with reference to a number of embodiments, the cover 16 according to the invention is rendered able to move with respect to the body of the wiper blade 6, the cover and the body of the wiper blade collaborating in order, on the one hand, to provide guidance for the cover as it moves and, on the other hand, to provide an end-of-travel end-stop in order to prevent the cover from escaping from the body of the blade.

According to a first embodiment, as depicted notably in FIGS. 2 to 4, the cover 16 comprises an upper wall 18, a first guide tab 56, a second guide tab 74, a retaining tab 36 and a central rib 92. This cover 16 is configured to collaborate with a blade body 102 having an opening 110, guide members 136, 152, in this instance in the form of sleeves, and an end-of-travel end-stop member here in the form of an end-stop ring 120, as depicted notably in FIGS. 2 and 5. The body of the wiper blade 6 will be described in greater detail after the description of the cover 16 which follows.

As illustrated in greater detail in FIGS. 3 and 4, the upper wall 18 of the cover 16 extends chiefly in a longitudinal and transverse plane, the transverse axis C being parallel to the axis of rotation B defined hereinabove and perpendicular to a longitudinal axis A. The upper wall 18 is configured to cover at least part of the opening 110 of the body 102 of the wiper blade 6. The upper wall 18 is planar and rectangular and is delimited by a first transverse side 22, a first longitudinal side 24, a second transverse side 26 and a second longitudinal side 28. Furthermore, the upper wall 18 comprises a first upper face 23 and an opposite lower face 25 intended to face the body 102 of the wiper blade 6, and more particularly to face a blade rubber.

The first transverse side 22 is defined as being that side of the cover 16 that is intended to face the arm and, more particularly, to face the mounting hook 170 when the cover and the arm are connected to the body 102 of the wiper blade.

The first longitudinal side 24, the second transverse side 26 and the second longitudinal side 28 are each extended by an extension edge 30 of the upper wall 18, the extension edge 30 extending from the lower face 25 along a vertical axis D perpendicular to the vertical longitudinal plane of the upper wall 18. The extension edge 30 associated with each longitudinal side 24, 28 has a chamfer 32, 34 in the vicinity of the first transverse side 22.

The second transverse side 26, in this instance the extension edge 30 associated with this second transverse side, is extended in the form of a retaining tab 36 which extends along the vertical axis D substantially perpendicular to the upper wall 18. The retaining tab 36 has a first free end 40 at the opposite end from the upper wall. The retaining tab 36 has a first internal face 42 and a first external face 44. The first internal face 42 is oriented towards the inside of the cover 16, namely towards the first transverse side 22, and lateral faces connecting the internal face 42 and external face 44 to one another.

The first internal face 42 of the retaining tab 36 comprises an end-stop finger 50 at the level of the first free end 40, the end-stop finger 50 forming a projection oriented towards the first transverse side 22 of the upper wall 18. The end-stop finger 50 has a shoulder 52, thus forming an end-stop wall 54 perpendicular to the first internal face 42 of the retaining tab 36. The end-stop finger 50 extends transversely along the first free end 40, across the entire width of the retaining tab 36. The end-stop finger 50 moreover comprises a ramp 48 connecting the first free end 40 to the end-stop wall 54. This end-stop finger 50 forms end-of-travel end-stop means for the cover which are able, as will be described hereinafter, to collaborate with end-of-travel end-stop members connected to the body of the wiper blade.

The transverse dimension, or width, of the retaining tab 36 is not as great as the width of the second transverse side 26. This width of the retaining tab may notably represent only 20 to 50% of the width of the second transverse side 26. In addition, the retaining tab 36 is centred transversely on the second transverse side 26 of the upper wall 18, which is to say that those portions of the second transverse side 26 of the upper wall 18 which are situated on each side of the retaining tab 36 are of equal dimensions.

The first longitudinal side 24, in this instance the extension edge 30 associated with this first longitudinal side 24, is extended to form a first guide tab 56. The first guide tab 56 extends perpendicularly to the upper wall 18, parallel to the vertical axis D. Similarly, the second longitudinal side 28 of the upper wall 18 is extended to form a second guide tab 74. In the illustrated example of this first embodiment, the second guide tab 74 is symmetrical with respect to the first guide tab about a longitudinal and vertical midplane of the cover.

These guide tabs are notably configured to form a means of guiding the cover in the body of the wiper blade and more particularly in this instance a means of translational guidance allowing the cover to effect a translational movement between the covering position and the moved-clear position.

Each guide tab 56 has a second free end 60, situated at the opposite end from the upper wall 18. The second free end 60 has a first flat edge 62 parallel to the longitudinal axis A. The second free end 30 also comprises a third chamfer 64 and a fourth chamfer 66. The third and fourth chamfers 64 and 66 are situated one on each side of the first flat edge 62 of the second free end 60.

Each guide tab 56 has a second internal face 68 and a second external face 70. The second internal face 68 is oriented towards the inside of the cover 16, namely towards the second longitudinal side 28 of the upper wall 18, and lateral faces connecting the internal face 68 and external face 70 to one another.

The second internal face 68 comprises an opening forming a first slot 72, indicated by a diagonally-hatched zone in all the figures. The first slot 72 extends along the guide tab, perpendicularly to the upper wall 18, in this instance from the extension edge 30 as far as the second free end 60. Furthermore, the first slot 72 has a length, or longitudinal dimension parallel to the longitudinal axis A, substantially equal to the corresponding longitudinal dimension of the first flat edge 62.

Using this same measurement frame of reference, the longitudinal dimension of each guide tab 56, 74 represents only approximately 40% of the longitudinal dimension of the corresponding longitudinal side of the upper wall 18. This proportion between the longitudinal dimension of the guide tab and that of the corresponding longitudinal side makes it possible to avoid the blocking of the guide tab 56 when guiding the translational movement of the cover 16.

In addition, the guide tab 56 is centred on the corresponding longitudinal side of the upper wall 18, which is to say that those portions of the longitudinal side 24 of the upper wall 18 which are situated on each side of the guide tab 56 are of equal dimensions.

The upper wall 18 comprises a central rib 92 extending chiefly in the vertical longitudinal plane, parallel to the guide tabs. The central rib 92 projects from the lower face 25 of the upper wall 18 between the guide tabs 56, 74, at equal distances from the longitudinal sides 24, 28. The central rib 92 is delimited longitudinally by the first transverse side 22 of the upper wall 18.

The central rib 92 has a fourth free end 96. The height between the lower face 25 of the upper wall 18 and the fourth free end 96 of the central rib 92 is measured parallel to the vertical axis D, and represents approximately 50% of the corresponding vertical dimensions of the guide tabs 56, 74 and of the retaining tab 36.

The central rib 92 has a concave edge 98 which extends between the first transverse side 22 of the upper wall 18 and the fourth free end 96, and the curvature of which is substantially equal to the curvature of the mounting hook 170. The central rib 92 here takes the form of a wing, with a convex edge 100 which connects the fourth free end 96 to the lower face 25 of the upper wall 18.

As specified hereinabove, the cover 16 is intended to collaborate according to the invention with the body 102 of the wiper blade 6, more particularly illustrated in FIG. 5. The body 102 extends chiefly along the longitudinal axis A and comprises a first lateral wall 104, an intermediate wall 106 and a second lateral wall 108. The lateral walls 104 and 108 are substantially parallel to one another and are each solid with the intermediate wall 106, thus giving the body 102 of the wiper blade 6 the shape of a "U". The intermediate wall 106 has an outer face 105 and an opposite inner face 107, the inner face 107 facing towards the inside of the body 102 of the wiper blade 6.

The body 102 thus defines an internal volume configured and dimensioned to house the connection device 172 visible in FIG. 2, as well as the blade rubber, not visible here, this internal volume being accessible via the opening 110 formed in the intermediate wall 106 to allow the arm 4 to pass from outside the body 102 towards the internal volume, in the direction of the connection device 172. As has been specified previously, this internal volume notably comprises an attachment zone 111, intended to accept at least the connection device 172 and the mounting hook 170 of the arm 4, and a clear zone 113 allowing the hook to be moved clear away from the connection device so that it can be attached and unhooked. These two zones of the internal volume are both accessible via the opening 110.

The opening 110 is delimited by a first transverse edge 112, a first longitudinal edge 114, a second transverse edge 116 and a second longitudinal edge 118. The first longitudinal edge 114 delimiting the opening 110 is more particularly defined as being the edge situated along the first lateral wall 104 of the body 102 of the wiper blade 6, and the second longitudinal edge 118 delimiting the opening 110 as being the edge situated along the second lateral wall 108 of the body 102 of the wiper blade 6. The two longitudinal edges 114, 118 extend parallel to one another and parallel to the longitudinal axis A, and the two transverse edges 112, 116 extend perpendicular to these longitudinal edges. The intermediate wall 106 has a bulge 119 which projects from the inner face 107 at the level of the second transverse edge 116 of the opening 110.

As was disclosed previously, the body 102 comprises end-of-travel end-stop members configured so that the cover 16 remains attached to the wiper blade 6 whatever the position of this mobile cover relative to the body 102. These end-of-travel end-stop members present on the body 102 are intended to collaborate with complementing means borne by the cover 16 and more particularly the retaining tab 36 produced as being distinct from the guide tabs 56, 74.

In this first embodiment, the end-of-travel end-stop members are formed by an end-stop ring 120 projecting from the second transverse edge 116 delimiting the opening 110. More particularly, the end-stop ring extends across the opening 11 starting from the bulge 119 of the intermediate wall 106. The end-stop ring 120 in this instance takes the form of a bow with a transverse member 124 extending some distance away from the second transverse edge 116 of the opening 110 and two lateral members which connect the transverse member 124 to the second transverse edge 116.

The end-stop ring 120 has a lower surface 132 and an upper surface 134. The lower surface 132 of the retaining ring 120 faces towards the internal volume of the body 102, the upper surface 134 being the opposite surface to the lower surface and intended to be in contact with the wall 18 of the cover 16.

The end-stop ring 120 is dimensioned to, on the one hand, allow through the retaining tab 36 when the cover is being fitted on the blade body and, on the other hand, prevent this retaining tab from being withdrawn, via interaction between the lower surface 132 of the end-stop ring 120 and the end-stop finger 50 formed at the free end of the retaining tab of the cover, as will be described hereinafter.

The first lateral wall 104, on an internal face facing towards the internal volume of the body, comprises a first guide sleeve 136 which forms a projection from the first lateral wall 104 towards the inside of the body 102 of the wiper blade 6. The first guide sleeve 136 is rectangular in section and comprises a first guide wall 138, a second guide wall 140 and a third guide wall 142, the second guide wall 140 extending parallel to and some distance from the first lateral wall 104. The guide walls 138, 140, 142 represent three sides of the rectangular section of the first guide sleeve 136, the fourth side being formed by the first lateral wall 104. The first guide sleeve 136 thus has a closed section and extends chiefly along the vertical axis D, between an orifice 148 oriented towards the opening 110 of the body 102, and an end wall 150. Furthermore, the first guide sleeve 136 comprises a guide face 144 facing towards the inside of the first guide sleeve 136, extending between the orifice 148 and the end wall.

The second lateral wall 108 comprises a second guide sleeve 152. The second guide sleeve 152 is symmetrical with the first guide sleeve 136 with respect to the plane AD. The references associated with the first guide sleeve 136 also apply to the second guide sleeve 152.

The end walls 150 of the first guide sleeve 136 and the second guide sleeve 152 are formed by a reinforcing bar 168 which connects the lateral walls 104, 108 to one another.

The guide sleeves 136, 152 of the body 102 are dimensioned to accept the corresponding guide tab 56, 74 of the cover 16, so that the internal face 68 of the guide tab faces the guide face 144 of the guide sleeve. Thus, the transverse dimension of the guide tab is substantially similar to the internal transverse dimension of the corresponding guide sleeve, that is to say the distance between the guide face 144 of the second guide wall 140 and the first lateral wall 104, so that the transverse travel of the cover with respect to the body 102 is limited, or even nil. Furthermore, the longitudinal dimension of the guide tab is slightly smaller than the internal longitudinal dimension of the corresponding guide sleeve, that is to say the distance between the guide face 144 of the first guide wall 138 and the third guide wall 142 so that a small amount of longitudinal travel of the cover with respect to the body 102 is permitted, notably so as to allow simultaneous insertion of the retaining tab through the end-stop ring and of the guide tabs in the guide sleeves.

More specifically, the guide sleeves may be dimensioned to form position-maintaining means for maintaining the position of the cover, whether this is in the covering position or in the moved-clear position. The transverse dimension of the sleeve is therefore tailored so that it is slightly smaller than the corresponding transverse dimension of the guide tab intended to slide inside this sleeve. Insertion is therefore performed forcibly and the tight fit of the guide tab prevents the guide tab 56 from moving along the vertical axis D under the effect of its own weight or under the effect of vibrations of the vehicle, user intervention alone allowing the guide tab to be moved in the corresponding guide sleeve.

As mentioned in the above description, the guide sleeves 136 and 152 are dimensioned to accept the guide tabs 56 and 74 of the cover 16, and the end-stop ring 120 is dimensioned to accept the retaining tab 36 of the cover 16. It is of note that, according to the invention, the end-stop ring forms a projection from one edge, in this instance a transverse edge, delimiting the opening which is perpendicular to the opening-delimiting edges from which the guide sleeves extend as a projection. The layout of the corresponding means on the cover, namely of the retaining tab on the one hand and of the guide tabs on the other hand, reflects the same characteristic whereby those means that have a function of acting as an end-of-travel end-stop are arranged perpendicularly to those means that have a function of guiding the movement of the cover in the body. Such an arrangement notably makes it possible, as was specified hereinabove, to ensure a tight fit in one direction so as to allow the cover to be held in position, whether this is in the covering position or in the moved-clear position, while at the same time providing an end-of-travel end stop to halt the cover in the moved-clear position by means of a tongue that can deform elastically in a perpendicular direction.

According to the invention, the cover 16 is able to move between a covering position, as depicted in FIGS. 6 and 7, and moved-clear position, as depicted in FIG. 8. The cover and the body are in this instance configured to allow translational mobility from one position to the other along the vertical axis D. It is necessary to ensure that the first transverse edge 22 of the cover 16, when the cover 16 is in a moved-clear position, is distant from the connection device 172 so that the mounting hook 170 can pass around the connection device 172 and hook under same. When the mounting hook 170 is secured to the connection device 172, the space between the connection device 172 and the first transverse edge 22 can be reduced, the cover 16 positioning itself in a covering position.

The collaboration between the cover 16 and the body 102 of the wiper blade 6 will now be described, beginning with the fitting of the cover 16 to the body 102 followed by the positioning of the cover 16 in a covering position in which the upper wall 18 of the cover 16 collaborates with some of the edges delimiting the opening 110 in order to cover part of the internal volume of the body, namely the clear zone 113, or in the moved-clear position on the body 102, in which the transverse edges 22 and 26 and longitudinal edges 24 and 28 of the upper wall 18 are distant from the opening 110 of the body 102.

The covering position of the cover is notably illustrated in FIGS. 6 and 7. The upper wall 18 of the cover 16 is positioned in the longitudinal and transverse plane, in the continuation of the intermediate wall 106 of the body 102. Through this arrangement, the first longitudinal side 24 of the upper wall 18 faces a portion of the first longitudinal edge 114 of the opening 110, the second transverse side 26 of the upper wall 18 faces a portion of the second transverse edge 116 of the opening 110 and the second longitudinal side 28 of the upper wall also faces a portion of the second longitudinal edge 118 of the opening 110.

As is notably visible in FIG. 7, in this covering position, each guide tab 56, 74 is housed in its entirety in the corresponding guide sleeve 136, 152. The second internal face 68 of the guide tab is in contact with the second guide wall 140 of the corresponding guide sleeve. However, the opening of the first slot 72 of the second internal face 68 is not in contact with the second guide wall 140 of the guide sleeve, so as to reduce friction between said guides tab 56, 74 and said guide sleeve 136, 152. The second internal face 70 of the guide tab is in contact with the corresponding lateral wall of the body 102. The second free end 60 of each guide tab extends in the vicinity of the end wall 150 of the corresponding guide sleeve.

In this covering position, the junction between the guide tab and the extension edge 30 is situated at the level of the orifice 148 of the corresponding guide sleeve. As may be seen in FIG. 7, the transverse dimension of each guide tab is small in comparison with the width of the extension edge 30, a shoulder 69 thus generating a bearing surface allowing the guide tab and the associated extension edge to rest on the walls delimiting the guide sleeve.

Finally, as may be seen in FIG. 6, the retaining tab collaborates in this covering position with the end-stop ring 120 of the body 102, a portion of the retaining tab 36 of the cover 16, close to the upper wall 18, extending through this end-stop ring 120, with the first internal face 42 of the retaining tab 36 facing the transverse member 124 of the end-stop ring 120 and the first external face 44 of the retaining tab 36 facing the bulge 119 of the intermediate wall 106 of the body 102.

In this covering position, the extension edge 30 of the upper wall 18 is therefore in contact with the upper surface 134 of the end-stop ring 120, whereas the first free end 40 of the retaining tab 36 is not in contact with anything.

When the cover 16 is being fitted, the first free end 40 of the retaining tab 36 is positioned facing the end-stop ring 120. At the same time, the free ends of the guide tabs of the cover are positioned facing the corresponding guide sleeves. The cover and body assembly is configured so that, in this position, the ramp 48 of the end-stop finger is in contact with the upper surface of the end-stop ring, the longitudinal dimension of the retaining tab 36 at the level of the end-stop ring preventing the retaining tab from being inserted through the end-stop ring without elastic deformation of the retaining tab. In other words, the cover and the body are configured in such a way that the first internal face 42 of the retaining tab 36 is aligned vertically with the internal face of the transverse member 124 of the end-stop ring 120 when the guide means belonging to the cover and to the body are collaborating, and the projection formed by the end-stop finger prevents the retaining tab from slipping through the end-stop ring without the retaining tab having been elastically deformed beforehand.

User pressure on the cover along the vertical axis D allows the retaining tab 36 to be deformed, by sliding along the ramp, thereby offsetting the free end of this retaining tab away from the guide tabs and thus allowing the end-stop finger 50 to pass through the retaining ring 120. Once the shoulder 152 has passed through the end-stop ring 120, the end-stop finger 50 returns to its original position, namely substantially perpendicular to the upper wall 18 with the first internal face 42 of the retaining tab 36 aligned vertically with the internal face of the transverse member 124 of the end-stop ring 120. Consequently, the shape of the end-stop finger 50 and the presence of the shoulder 52 prevent the end-stop finger 50 from passing back through the end-stop ring 120 in the other direction. This end-stop finger formed on the cover forms an end-of-travel end-stop means complementing an end-of-travel end-stop member formed by the end-stop ring 120 which is solid with the body.

During a change of wiper blade 6 of a wiper system 2, the cover 16 is positioned in a moved-clear position by translational movement along the vertical axis D starting from the covering position. As has been specified, the cover thus frees up enough space for the hook 170 of the arm 4 to be fitted or removed from the connector 172 of the wiper blade 6. When the cover 16 is in a moved-clear position, the first longitudinal side 24, the second transverse side 26 and the second longitudinal side 28 of the upper wall 18 are no longer in contact with the first longitudinal edge 114, the second transverse edge 116 and the second longitudinal edge 118 of the opening 110.

The user wishing to translate the cover with respect to the body in order to move it into the moved-clear position, takes hold of the cover 16 at the first transverse edge 22, slipping a finger or a tool between this first transverse edge and the mounting hook 170 of the arm. Once the cover 16 has been grasped, the user moves the cover in vertical translation relative to the body 102. It will therefore be appreciated that the concave edge 98 of the central rib 92 of the cover 16 needs to be facing the mounting hook 170, and as close as possible thereto, in order to avoid the ingress of water and of dirt, without in any way the cover 16 being in contact with the mounting hook 170, so as to allow the user to manipulate the cover 16.

As stated previously, the transition from the covering position to the moved-clear position is achieved through a translational guidance of the cover 16, and particularly of the guide tabs 56, 74 inside the guide sleeves 136, 152, the complementing nature of the shapes allowing only a translational movement along the vertical axis D of the guide tabs 56 and 74.

The retaining tab 36 is also translated along the vertical axis D in sliding through the end-stop ring 120. The vertical translation of the cover continues until the end-stop finger 50 of the retaining tab 36 comes into abutment against the lower surface 132 of the end-stop ring 120. More specifically, the end-stop wall 54 of the end-stop finger 50 is in contact with the lower surface 132 of the end-stop ring 120 at the transverse member 124 of said end-stop ring 120. The retaining tab 36 is thus retained in the end-stop ring 120 and these complementing end-of-travel end-stop means and members are able to halt the cover 16 in its movement and thus define the moved-clear position, the cover not being detached from the body 102 of the wiper blade 6 in this moved-clear position. Such a moved-clear position is notably illustrated in FIG. 8.

In this moved-clear position of the cover 16, the free ends of the guide tabs 56, 74 are still partially housed in the guide sleeves 136, 152, so that they can start to guide the cover 16 in a translational movement in the opposite direction towards the covering position. For that, the vertical dimension of the guide tabs 56, 74 is necessarily greater than the vertical dimension of the retaining tab 36, allowing the free ends of the guide tabs 56, 74 to remain housed in the guide sleeves 136, 152 when the end-stop finger 50 of the retaining tab 36 is in contact with the retaining ring 120.

There will now be described, notably with reference to FIGS. 9, 10 and 11, a second embodiment that differs from the first embodiment described hereinabove in that the cover 16 does not have a central rib, in that the retaining tab 36 has two retaining ribs, as described herein below, and also in that the cover comprises position-maintaining means, in this instance in the form of bumps, on the lower face 25 of the upper wall 18 and on the end-stop finger 50. However, certain elements common to the two embodiments have kept the same name and number. The description of this second embodiment may refer to FIGS. 1 to 8, without compromising the independent understanding of each of FIGS. 9, 10 and 11.

The retaining tab 36 comprises a first retaining rib 178 and a second retaining rib 180. The retaining ribs 178 and 180 project out from the first internal face 42 of the retaining tab 36, respectively extending, perpendicularly to the retaining tab 36 and to the upper wall 18, the first lateral face 44 and the second lateral face 46 of said retaining tab 36.

Each retaining rib 178, 180 has a longitudinal dimension that can vary from the upper wall 18 as far as the first free end 40 of the retaining tab 36. More specifically, the longitudinal dimension of each retaining rib 178, 180 decreases progressively with increasing distance away from the upper wall 18, until it becomes nil in the vicinity of the first free end 40. This variable longitudinal dimension affects the stiffness of the retaining tab 36, which is thus stiffer in the vicinity of the extension edge 30 than at the level of the first free end 40. Each retaining rib thus exhibits a triangular shape.

The end-stop finger 50 in this instance extends as a projection from the first external face 44 of the retaining tab 36, as before forming an end-stop wall 54.

The lateral faces of the retaining tab 36, namely the faces that connect the first internal face 42 to the first external face 44, comprise, at the level of the end-stop finger 50, at least a first retaining bump 45 forming, for example, a hemispherical boss. The retaining bumps 45 are intended to collaborate with a mating shape 192 of the body 102, visible notably in FIG. 11, when the cover is in the moved-clear position, after translational movement of the cover. The retaining bumps 45 are configured in terms of shape and dimension so that they can be clipped via elastic deformation of the retaining tab 36 into the corresponding mating shapes of the body 102 and thus fix the moved-clear position. In that way, the retaining bumps 45 form position-maintaining means maintaining the moved-clear position of the cover, and the mating shapes 192 form complementing position-maintaining members maintaining the moved-clear position.

According to this second embodiment, the cover and the body also comprise complementing position-maintaining means and members for keeping the cover in the covering position. More specifically, the cover 16 has oblong bumps 177, 179 projecting respectively from a longitudinal side at the level of the extension edge 30.

As illustrated in FIG. 9, the oblong bump is situated more specifically between the chamfer and the guide tab 56 which are present on the corresponding longitudinal side. The oblong bump is intended to become housed in an opening, of corresponding shape and dimensions, belonging to the body 102 of the wiper blade 6. It is notable in this embodiment that the oblong bumps are arranged in the vicinity of the first transverse edge 22 of the upper wall 18, which, as specified previously, is the edge of the cover via which the user grasps hold of the cover in order to move it into the moved-clear position. Consequently, the position of the oblong bumps means that less force needs to be exerted when manipulating the cover 16 towards the moved-clear position. The body 102 of the wiper blade 6 is designed to collaborate with the cover 16 disclosed in this second embodiment.

As illustrated in FIG. 10, the body 102 of the wiper blade has a first opening 191 on the lateral wall 104 and a second opening 193 on the second lateral wall 108, each opening being dimensioned, in this instance with an oblong shape, to collaborate with one of the oblong bumps 177, 179 of the cover 16 so that when the cover 16 is in a covering position, each oblong bump becomes housed in the corresponding opening.

The positioning of the first oblong bump 177 in the first opening 181, and the positioning of the second oblong bump 179 in the second opening 183 thus maintain the cover 16 in a position of covering the opening 110 of the wiper blade 6, and it will be appreciated that these oblong bumps and these openings respectively form position-maintaining means and members for keeping the cover in the covering position.

It should be noted that, in this second embodiment, the intermediate wall 106 of the body 102 no longer comprises either a bulge or an end-stop ring.

The retaining ribs 178, 180 are thus configured to allow the free end of the retaining tab 36 some flexibility when stress is applied to this free end, and to stiffen the retaining tab at its base so that the retaining tab does not flex in the event of vibrations from the running vehicle for example. When the cover 16 is in a covering position, the retaining tab 36 is housed in the body 102 of the wiper blade 6 without being held by the end-stop finger as before. The other elements of the cover 16 are housed in the way explained in the first embodiment.

When the cover 16 passes from the covering position to the moved-clear position, the oblong bump 177 of the cover 16 moves clear of the first opening 181 of the first lateral wall 104, and the second oblong bump 179 of the cover 16 also moves clear of the second opening 183 of the second lateral wall 108, through elastic deformation.

When the cover 16 reaches the moved-clear position, the end-stop finger 50 is in contact with the first inner face 107 of the intermediate wall 106 and, more particularly, at the level of a recess 185 made in the intermediate wall. The recess 185 comprises at least one opening 197 intended to accept one of the retaining bumps 45 of the end-stop finger 50.

When the cover 16 passes from a covering position to a moved-clear position, the end-stop finger 50 therefore becomes housed in the recess 185 and the end-stop finger and the recess form end-of-travel end-stop means and members able to halt the movement of the cover in the moved-clear position. The openings 197 collaborate with the retaining bumps 45 of the end-stop finger 50 to form position-maintaining means and members for keeping the cover in the moved-clear position.

In accordance with that which has been described hereinabove, the cover is dimensioned so that elastic deformation of the retaining tab 36 is required in order to insert the first free end 40 into the internal volume of the body. This flexibility is provided by the variable longitudinal dimensions of the retaining ribs which are associated with the retaining tab 36.

It should be noted that features described in respect of the first and second embodiments could be combined to form a third embodiment, for example by combining the presence of a retaining tab 36 with retaining ribs 178 and 180 and a central rib 92.

A fourth embodiment proposes a cover 16 as illustrated in FIGS. 12, 13 and 14, which comprises an upper wall 18, a retaining tab 36, a central rib 92 and a second guide tab 74 which are as described in the first embodiment, and which embodiment differs from the first embodiment in that the extension edge 30 extending from one of the lateral sides, in this instance the first longitudinal side 24, of the upper wall 18 is extended in the form of two guide tabs 186 and 188 which are distinct from one another, rather than in the form of a single one as before.

The extension edge 30 of the upper wall 18 is extended at the level of the first longitudinal side 24 of said upper wall 18, in the form of a third guide tab 186 and a fourth guide tab 188 which are distinct from one another. The guide tabs 186 and 188 extend perpendicular to the upper wall 18, in the same direction and along the same axis as the retaining tab 36 and the second guide tab 74. The shape of the third guide tab 186 and the fourth guide tab 188 are identical to the guide tabs described previously.

As may be seen in FIG. 12, the third and fourth guide tabs 186, 188 are longitudinally separated by a slit 226, in this instance centred on the first longitudinal side 24 of the upper wall 18.

Correspondingly, the body 102 is in this regard similar to that of the first embodiment, with the exception of the shape of one of the guide sleeves. Specifically, in place of the first guide sleeve 136 there is provided a guide element 228 intended to house the third and fourth guide tabs 186 and 188 simultaneously.

The guide element 228 is in this instance solid with the first lateral wall 104 of the body 102. The guide element 228 is situated facing the second guide sleeve 152. The guide element 228 comprises a bar 230 and a common guide wall 232 which extends parallel to the first lateral wall 104. The bar 230 is solid with the first lateral wall 104 and with the centre of the common guide wall 232, and is dimensioned to fit in the slit 226 of the cover 16. The guide element 228 extends from the opening 110 as far as the reinforcing bar 168, which is common to the second guide sleeve 152, arranged on the second lateral wall 108.

The common guide wall 232 and the bar 230 of the guide element 228 and the first lateral wall 104 thus delimit a first guide space 246 and a second guide space 248, these respectively being intended to house one of the third and fourth guide tabs 186 and 188.

The cover 16 is intended to collaborate with the body 102, in a way similar to the first embodiment. The third and fourth guide tabs 186 and 188 are housed in the first guide space 246 and the second guide space 248.

In accordance with that which has been described hereinabove, the movement of the cover 16 in translation along the vertical axis D is also halted at the end of travel by contact of the end-stop finger 50 of the cover 16 against the end-stop ring 120 of the body 102, which thus form end-of-travel end-stop means and members for the end of the travel of the cover in the moved-clear position. In a way similar to the first and second embodiments, position-maintaining means and members may allow the cover 16 to be kept in a moved-clear position, but also in a covering position, by close guidance of the guide tabs as depicted in the first embodiment, or through collaboration of bumps and of mating shapes, as described notably in the second embodiment.

The invention claimed is:

1. A cover for a wiper blade, said cover being configured to collaborate with a body of the wiper blade in a position of covering an opening formed in the body, the cover comprising:
a plurality of guide tabs;
an upper wall being dimensioned to cover part of the opening when the cover is in the covering position,
the guide tabs extending the upper wall perpendicularly and being configured to hold the cover in the covering position,
wherein the cover is configured to be moved in the body between a moved-clear position distant from the opening, and said position of covering of the opening; and
at least one retaining tab extending the upper wall perpendicularly separately from the guide tabs, said retaining tab comprising end-of-travel end-stop means configured to halt the retaining tab in said moved-clear position, wherein the cover is not detached from the body of the wiper blade in said moved-clear position, wherein the cover moves in the body between the covering position and the moved-clear position in a direction transverse to the upper wall, wherein in the moved-clear position, the upper wall is distant from the body of the wiper blade.

2. The cover according to claim 1, wherein the retaining tab extends chiefly in a plane perpendicular to the planes in which the guide tabs extend.

3. The cover according to claim 1, wherein the dimension of the retaining tab perpendicular to the upper wall is at least equal to half the corresponding dimension of the guide tabs.

4. The cover according to claim 1, wherein the upper wall comprises a central rib extending between the guide tabs, said central rib comprising a concave edge on the opposite side to the retaining tab.

5. The cover according to claim 4, wherein the retaining tab and the central rib are placed on opposite ends of the upper wall.

6. The cover according to claim 1, further comprising position-maintaining means maintaining the position of the cover in the covering position and in the moved-clear position.

7. A wiper blade comprising:
a body with an opening; and
a cover according to claim 1, the body comprising end-of-travel end-stop elements able to collaborate with the end-of-travel end-stop means borne by the retaining tab of the cover in order to halt the movement of the cover when the latter reaches the moved-clear position.

8. The wiper blade according to claim 7, wherein each of the guide tabs of the cover collaborates with a guide member solid with a wall of the blade body which delimits a housing for a connection device mounted with the ability to rotate with respect to said body.

9. A wiper blade according to claim 7, wherein the body comprises position-maintaining means maintaining the position of the cover in the covering position and in the moved-clear position.

10. A wiper blade according to claim 9, wherein the position-maintaining means that keep the cover in the covering position and the moved-clear position are formed by at least one guide member of which one dimension is tailored to achieve close guidance of the corresponding guide tabs and are formed by a mating shape formed in the body of the wiper blade and sized to collaborate with the position-maintaining means that keep the cover in the covering position and in the moved-clear position.

11. A wiper system comprising: an arm; and a wiper blade according to claim 7.

12. The cover according to claim 1, wherein the end-of-travel end-stop means extends across the entire width of the retaining tab and forms an end-stop wall perpendicular to the retaining tab.

13. A cover for a wiper blade, said cover being configured to collaborate with a body of the wiper blade in a position of covering an opening formed in the body, the cover comprising:

a plurality of guide tabs;

an upper wall being dimensioned to cover part of the opening when the cover is in the covering position, the guide tabs extending the upper wall perpendicularly and being configured to hold the cover in the covering position, wherein the cover is configured to be moved in the body between a moved-clear position distant from the opening, and said position of covering of the opening; and at least one retaining tab extending the upper wall perpendicularly separately from the guide tabs, said retaining tab comprising end-of-travel end-stop means configured to halt the retaining tab in said moved-clear position, wherein the cover is not detached from the body of the wiper blade in said moved-clear position, wherein the cover moves in the body between the covering position and the moved-clear position along an axis perpendicular to the upper wall at the covering position, wherein in the moved-clear position, the upper wall is distant from the body of the wiper blade.

* * * * *